United States Patent [19]
Kubota et al.

[11] Patent Number: 5,640,755
[45] Date of Patent: Jun. 24, 1997

[54] METHOD FOR MANUFACTURING A MAGNETIC HEAD

[75] Inventors: Toshio Kubota, Komoro; Tetsuo Miyazaki, Saku, both of Japan

[73] Assignee: TDK Corporation, Tokyo, Japan

[21] Appl. No.: 422,929

[22] Filed: Apr. 17, 1995

[30] Foreign Application Priority Data

Apr. 15, 1994 [JP] Japan .................................. 6-077031

[51] Int. Cl.$^6$ .................................................. G11B 5/127
[52] U.S. Cl. .................................. 29/603.16; 29/603.12; 216/17; 216/22; 360/103
[58] Field of Search ........................... 29/603.12, 603.16; 216/17, 22; 360/103

[56] References Cited

U.S. PATENT DOCUMENTS

| | | |
|---|---|---|
| 4,673,996 | 6/1987 | White . |
| 4,870,519 | 9/1989 | White . |
| 4,894,734 | 1/1990 | Fischler et al. . |
| 5,062,017 | 10/1991 | Strom et al. . |
| 5,087,992 | 2/1992 | Dahandeh et al. . |
| 5,359,480 | 10/1994 | Nepela et al. . |
| 5,515,219 | 5/1996 | Ihrke et al. ................ 360/103 |

FOREIGN PATENT DOCUMENTS

| | | |
|---|---|---|
| 49-121514 | 11/1974 | Japan . |
| 56-93112 | 7/1981 | Japan . |
| 57-122063 | 7/1982 | Japan . |
| 60-101781 | 6/1985 | Japan . |
| 60-205879 | 10/1985 | Japan . |
| 2-246067 | 10/1990 | Japan . |
| 4-30328 | 2/1992 | Japan . |
| 4-228157 | 8/1992 | Japan . |
| 5-298849 | 11/1993 | Japan . |
| 6-111508 | 4/1994 | Japan . |

Primary Examiner—P. W. Echols
Attorney, Agent, or Firm—Oblon, Spivak, McClelland, Maier & Neustadt, P.C.

[57] ABSTRACT

The slider is provided with at least one rail portion which extends between the trailing end portion and the leading end portion on one surface of the slider body. At least one magnetic transducer is provided on a line extended from the rail portion toward the trailing end of the slider body. The rail portion is provided with indented rail portions formed along the two sides and the rail surface, excluding the indented rail portions, forms the air bearing surface. The indented rail portions are formed shorter than the rail portion so that the air bearing surface continues all the way to, at least, the trailing end portion of the slider body. The width of the air bearing surfaces, which are cut into by the indented rail portions, is maintained at approximately the same dimension over the entire length of the indented rail portions. This reduces dependency of the flying height and flight attitute on the skew angle and, at the same time, prevents minute particles from the slider, generated through dry etching, from adhering to the side surfaces. Magnetic head elements are manufactured from a magnetic head aggregate which includes a section of a wafer to be formed into magnetic head elements, each magnetic head element comprising a slider body and at least one transducer, wherein the at least one transducer for each magnetic head element is formed at a trailing end of the magnetic head aggregate by fabricating a thin film element which is integrated with the slider body. A mask is placed over the magnetic head aggregate with openings through which the slider bodies are etched to form the indented rail portions. Finally, the magnetic head aggregate is machined to create the indented center portions and indented side portions, and the magnetic head aggregate is cut into plural magnetic head elements.

4 Claims, 10 Drawing Sheets

METHOD FOR MANUFACTURING A MAGNETIC HEAD

BACKGROUND OF THE INVENTION

1. Field of the Invention

The present invention relates to a magnetic head, a magnetic read/write apparatus and a method for manufacturing the magnetic head.

2. Discussion of Background

In a rotary actuator-type magnetic read/write apparatus, the technology that reduces the dependency of the magnetic head on the skew angle in order to ensure that the flying height is constant from the internal circumference of the magnetic disk to the external circumference, and to ensure a stable flight attitude, is of extreme importance. This technology improves reliability for high density recording, which requires that spacing loss be minimized by reducing the flying height. Consequently at very small flying heights, even if the flying height of the magnetic head changes only very slightly during a read or write operation, the magnetic head is likely to come into contact with the magnetic disk, causing a head crash, which in turn, causes problems such as destruction of data on the magnetic disk.

The technology to ensure that the flying height is constant from the internal circumference of the magnetic disk to the external circumference, and to ensure a stable flight attitude, is also essential for the zone bit recording technology required by high capacity magnetic disk drives. The zone bit recording technology is disclosed, for instance, in Japanese Unexamined Patent Publication (Kokai) No. 30328/1992, U.S. Pat. No. 4,894,734 and U.S. Pat. No. 5,087,992.

As a means for responding to the requirements described above, various types of magnetic heads, each of which features air bearing surfaces with a specific and unique contour, have been disclosed. White, for instance, discloses TPC (Transverse Pressurization Contour) type sliders in U.S. Pat. No. 4,673,996 and U.S. Pat. No. 4,870,519. A TPC slider is provided with very small indented portions running the entire length of the rail portion along the sides. A TPC slider, when fitted in a rotary actuator-type magnetic read/write apparatus, generates dynamic lift pressure at the indented portion due to the air current which flows in from the transverse direction when the skew angle is large, to prevent any reduction of the flying height at positions where the skew angle is large. With this, a consistent flying height is ensured from the internal circumference to the external circumference of the magnetic disk and, at the same time, the flight attitude is stabilized.

Also, Japanese Unexamined Patent Publication (Kokai) No. 101781/1985 discloses a slider for a magnetic head with a reduced dependency on the skew angle, achieved by making the rail width of the slider rail at the center in the direction of the length smaller than the width at both ends.

Furthermore, U.S. Pat. No. 5,062,017 discloses a magnetic head in which air bearing surfaces provided with an inside edge and an outside edge are formed on the surfaces of the rail portions. The inside edge and the outside edge are made to converge from the leading end edge of the slider toward an inflection point, and are made to diverge from the inflection point to the trailing end edge of the slider, thereby inhibiting any change in the flying characteristics relative to the skew angle.

Moreover, Japanese Unexamined Patent Publication (Kokai) No. 246067/1990 discloses a slider for a magnetic disk apparatus, which is formed in such a manner that the rail width is reduced starting from the end where the air flows in toward the end where the air flows out.

Of the technologies in the known art described above, in the TPC slider disclosed by White, the desired contour of the air bearing surfaces is imparted by machining over the entire length of the rail portions. The contour formation in this case must be performed through fine machining such as dry etching technology, including ion milling. Because of this, in the prior art technology, which requires machining over the entire length of the rail portion, the openings of the mask, which is necessary for dry etching, must be longer than the entire length of the rail portion and, inevitably, minute particles from the slider, generated in the dry etching process, adhere to the two side surfaces of the slider. The strength of adhesion of these particles to the slider is not great, and when the magnetic head is being operated in a magnetic read/write apparatus, the particles adhering to the side surfaces of the magnetic head enter into the narrow spacing gap between the magnetic disk and the magnetic head. This may damage the magnetic disk irreparably.

In addition, at one end of the slider in the direction of the length, bond pads (bump) for the magnetic transducers are provided. The bond pads, unlike the slider, which is constituted of a hard ceramic structure, are constituted of a soft metal material, such as gold. This causes the bond pads to be dry etched excessively in comparison with the slider and it may result in the surfaces of the bond pads falling off the surface of the slider. This, in turn, makes connecting lead wires to the bond pads difficult. The magnetic head disclosed in U.S. Pat. No. 5,062,017 requires a specifically contoured air bearing surfaces, in which the inside edge and the outside edge are made to converge from the leading end edge of the slider to an inflection point, and to diverge from the inflection point toward the trailing end edge of the slider.

SUMMARY OF THE INVENTION

It is an object of the present invention to provide a magnetic head with air bearing surfaces that feature a new contour, and a magnetic read/write apparatus which employs this magnetic head.

It is a further object of the present invention to provide a new magnetic head with which the flying height can be made constant and, at the same time, the flight attitude can be stabilized over a wide skew angle range and a magnetic read/write apparatus which uses this magnetic head.

It is a still further object of the present invention to provide a magnetic head and a magnetic read/write apparatus with which substances adhering to the magnetic head do not damage the magnetic disk or the magnetic head.

It is a still further object of the present invention to provide a magnetic head and a magnetic read/write apparatus with which the surface of the bond pads for the magnetic transducers do not fall off the surface of the slider.

It is a still further object of the present invention to provide a magnetic head and a magnetic read/write apparatus which achieves the objects described above while maintaining a relatively simple contour for the air bearing surfaces.

It is a still further object of the present invention to provide a magnetic head and a magnetic read/write apparatus that are optimized for achieving a large-capacity magnetic disk drive through adoption of the zone bit recording technology.

It is a still further object of the present invention to provide a magnetic head and a magnetic read/write apparatus which are very effective in improving reliability in high-density recording, which requires that spacing loss be reduced by minimizing the flying height.

It is a still further object of the present invention to provide a compact rotary actuator type magnetic read/write apparatus which can achieve a constant flying height and a stable flight attitude even at a large skew angle.

It is a still further object of the present invention to provide an optimal manufacturing method for manufacturing the magnetic head described above.

In order to achieve the objects described above, the magnetic head according to the present invention includes a slider and at least one magnetic transducer. The slider comprises a slider body which is, in turn, provided with a trailing end portion and a leading end portion. The slider is also provided with at least one rail portion which extends between the trailing end portion and the leading end portion, on one surface of the slider body. At least one magnetic transducer is provided on the line of the rail portions extended toward the trailing end of the slider body. The rail portion is provided with indented rail portions formed along the two sides. The rail surfaces, excluding the indented rail portions, form the air bearing surfaces. The indented rail portions are formed shorter than the rail portions so that the air bearing surfaces will continue all the way to, at least, the trailing end portion of the slider body. The width of the air bearing surfaces, which are cut into by the indented rail portions, is maintained at approximately the same dimension over the entire length of the indented rail portions.

As explained above, since the slider is provided with at least one rail portion which extends between the trailing end portion and the leading end portion on one surface of the slider body, the rail surfaces constitute the air bearing surfaces and at least one magnetic transducer is provided on the line of the rail portions extended toward the trailing end of the slider body. When used in a magnetic read/write apparatus, the present invention achieves stable flying characteristics with its rail portions and, at the same time, generates dynamic lift pressure between the magnetic disk and the air bearing surfaces. Thus, a magnetic head that performs magnetic write or read operations between at least one magnetic transducer and the magnetic disk is achieved.

The rail portions have indented rail portions provided along the two sides in this structure, and, as in the case of the TPC magnetic head disclosed by White, dynamic lift pressure is generated at the indented portions due to an air current which flows in from the transverse direction when the skew angle is large, to prevent loss of flying height at positions where the skew angle is large. With this, a consistent flying height is ensured from the internal circumference through the external circumference of the magnetic disk and, at the same time, the flight attitude is stabilized.

An important feature of the present invention, which differentiates it from the TPC magnetic head disclosed by White, is that the indented rail portions are formed shorter than the rail portions so that the air bearing surfaces continue all the way to, at least, the trailing end portion of the slider body. In the magnetic head with this new structure, when forming indented rail portions by positioning a mask that is provided with the opening portions necessary for forming the indented portions on the surface of the slider that faces opposite the medium, and by performing dry etching such as milling or the like through the opening portions of the mask, the opening portions required for dry etching can be made slightly shorter than the entire length of the rail portions. This eliminates the likelihood of minute particles from the slider generated in the dry etching process, adhering to the two side surfaces of the slider. As a result, a magnetic head and a magnetic read/write apparatus are achieved in which no damage to the magnetic disk or magnetic head occurs due to substances adhering to the magnetic head.

In addition, since the bond pads are not dry etched excessively in comparison with the slider, the surface of the bond pads do not fall off the surface of the slider. This makes it easier to connect lead wires to the bond pads.

The width of the air bearing surfaces, which are cut into by the indented rail portion, is maintained at approximately the same dimension over the entire length of the indented rail portions. Consequently, in the magnetic head according to the present invention, the major portion of the edges of the air bearing surfaces are linear, which differentiates the present invention from that disclosed in U.S. Pat. No. 5,062,017. Moreover, since it performs a basically similar operation to that performed by the TPC magnetic head disclosed by White, it differs from the invention disclosed in U.S. Pat. No. 5,062.017 in effect as well. In addition, according to the present invention, the mask pattern for forming the air bearing surfaces can be simplified.

The magnetic read/write apparatus according to the present invention includes a magnetic disk, a magnetic head, a suspension and a positioning apparatus. The magnetic disk mentioned earlier is driven rotationally and the magnetic head is the magnetic head according to the present invention, as has been described earlier. The suspension supports the magnetic head at one end and the positioning apparatus supports the other end of the suspension and causes the magnetic head to swing through an arc on a plane at a specific angle to the circumference of the magnetic disk.

The magnetic head and the magnetic read/write apparatus according to the present invention are driven by a rotary actuator type positioning apparatus. According to the present invention, even at a large skew angle, a nearly consistent flying height and a stable flight attitude are achieved. Therefore, the skew angle range can be increased. This makes it possible to respond to the need for smaller magnetic read/write apparatuses by allowing for a larger maximum skew angle.

The manufacturing method according to the present invention includes a plurality of processes, as explained below, in manufacturing the magnetic head described above. The first process is a step in which a magnetic head aggregate is positioned on a support member. A magnet head aggregate includes a section of a wafer to be formed into magnetic head elements, each magnetic head element comprising a slider body and at least one transducer, wherein the at least one transducer for each magnetic head element is formed at a trailing end of the magnetic head aggregate by fabricating a thin film element which is integrated with the slider body. The magnetic head aggregate is processed into a plurality of magnetic head elements while it is positioned on the support member with the magnetic elements leading to the surface that will face opposite the disk medium. At least one magnetic transducer is formed at the trailing end of the magnetic head aggregate for each unprocessed magnetic head element.

In a second process, a mask is positioned on the surface of the magnetic head aggregate that has been positioned in the first process. The mask is provided with opening portions at positions which correspond to, at least, a first indented rail portion and a second indented rail portion of the aforementioned indented rail portions. The size of the opening portions, and position at which the opening portions open only within the aforementioned surface of the magnetic head aggregate, are pre-determined.

In a third process that follows the second process, dry etching for forming the indented rial portions is performed on the surface of the magnetic head aggregate through the opening portions.

A fourth process, which follows the third process, includes a step in which the machining required for the magnetic head is performed, leaving the areas where the indented rail portions were formed untouched.

Preferably, the first process described above should include a step in which a plurality of magnetic head aggregates are positioned in parallel and the second process described earlier should include a step in which a common mask is positioned for the aforementioned plurality of magnetic head aggregates.

In the manufacturing method according to the present invention, minute particles from the slider, generated in the dry etching process, can be prevented from becoming adhered to the two side surfaces of the slider. As a result, a magnetic head and a magnetic read/write apparatus that do not damage the magnetic disk or the magnetic head due to substances adhered to the magnetic head, can be manufactured.

Moreover, with the manufacturing method according to the present invention, since the bond pads are not excessively dry etched compared to the slider, the surfaces of the bond pads do not fall off the slider surface, thereby making it easier to connect lead wires to the bond pads. The present invention can be applied to the prior art technologies described earlier as a technology in which fine machining of the air bearing surfaces is performed.

BRIEF DESCRIPTION OF THE DRAWINGS

These and other advantages, features and objects of the present invention will be understood by those of ordinary skill in the art referring to the attached drawings, given purely by way of non-limitative example, in which.

DETAILED DESCRIPTION OF THE PREFERRED EMBODIMENTS

Figure 1:
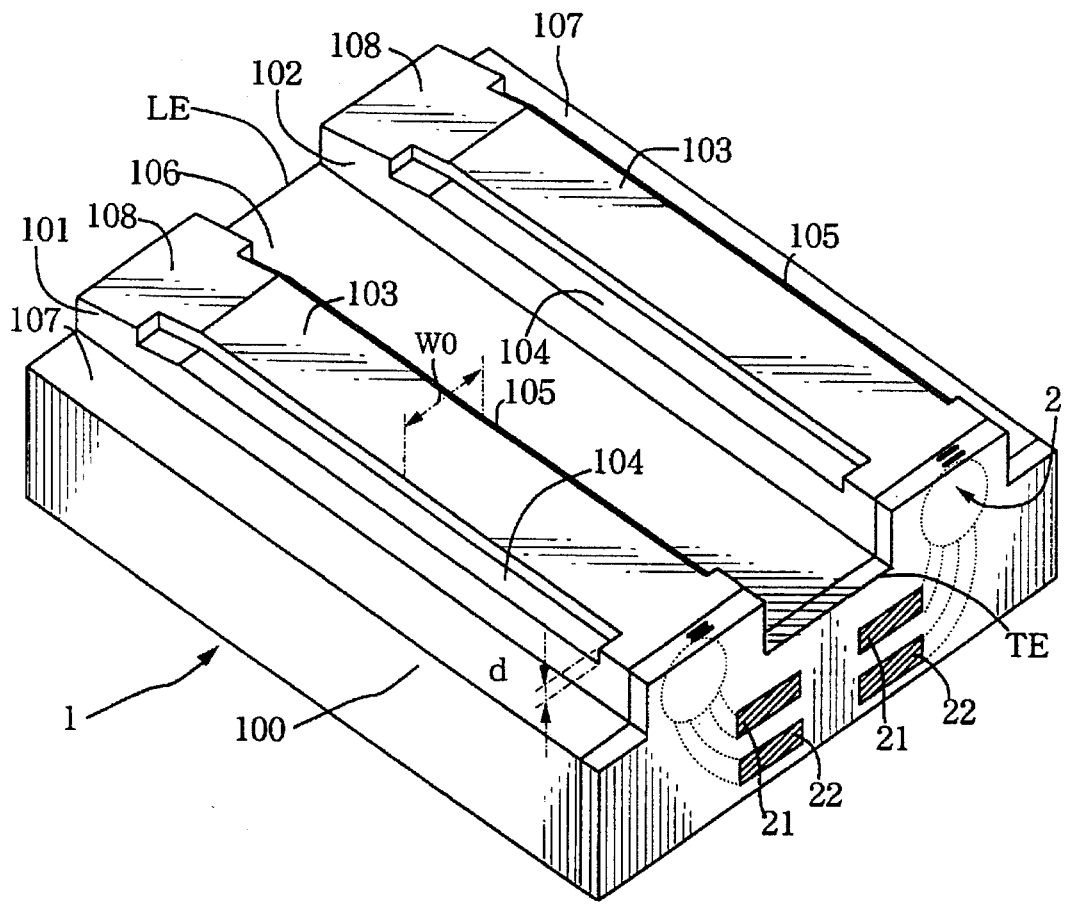
FIG. 1 is a perspective of the magnetic head according to the present invention.
Figure 2:
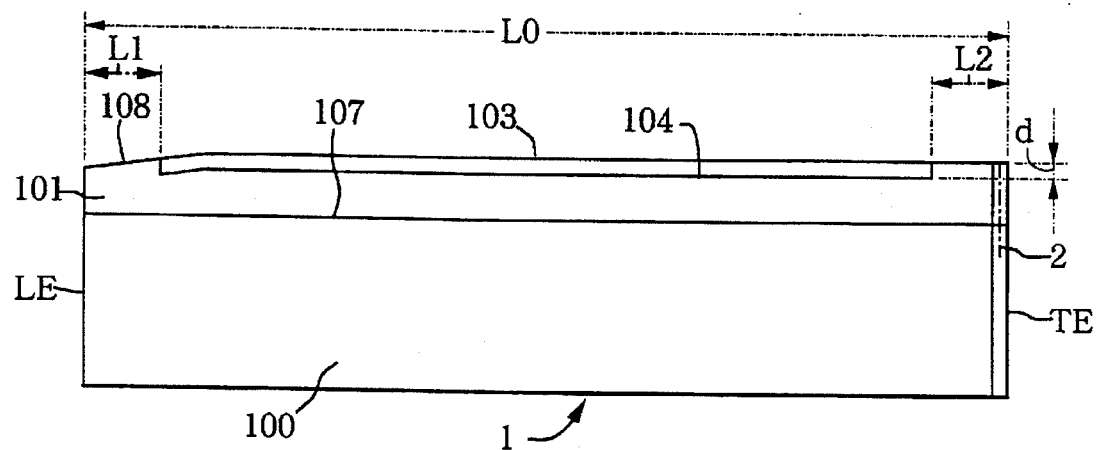
FIG. 2 is a side elevation of the magnetic head shown in FIG. 1.

FIG. 1 is a perspective of the magnetic head according to the present invention and FIG. 2 is a side elevation of the magnetic head shown in FIG. 1. In these figures, some dimensions are exaggerated. The figures show that the magnetic head according to the present invention includes a slider 1 and at least one magnetic transducer 2. The slider 1 is provided with a slider body 100 which, in turn, is provided with a trailing end TE and a leading end LE.

The slider 1 has at least one rail portion 101 or 102 which extends between the trailing end TE and the leading end LE on one surface of the slider body 100. Generally, the structure of a magnetic head of this type includes two rail portions 101 and 102, which are provided parallel to each other over an interval. In the embodiment two magnetic transducers 2 are provided on the line of the rail portions 101 or 102, extended toward the trailing end TE of the slider body 100. The magnetic transducers 2 are normally constituted of thin film elements.

The rail portions 101 and 102 are each provided with indented rail portions 104 and 105, formed along the two sides. The rail surfaces excluding the intended rail portions 104 and 105, constitute air bearing surfaces 103. The indented rail portions 104 and 105 are each formed shorter than the length L0 of the rail portions 101 and 102 so that the air bearing surfaces 103, the length of which is L2, continues all the way to, at least, the trailing end TE of the slider body 100. In this embodiment, the indented rail portions 104 and 105 are formed in such a manner that the air bearing surfaces 103, the length of which is L1, also continue all the way to the leading end of the slider body 100. The indented rail portions 104 and 105 are each formed with an indented portion d which drops off from the air bearing surfaces 103. The lengths L1 and L2 of the air bearing surfaces 103 which continue all the way to the leading end and the trailing end are sufficiently short compared to the length L0 of the rail portions 101 and 102.

The width W0 of the air bearing surfaces 103, which are cut into by the indented rail portions 104 and 105, is approximately the same over the entire length of the indented portions 104 and 105.

In the slider I in the figures, the gap created between rail portion 101 and raft portion 102 constitutes another indented portion, a center indented portion 106 which drops down from the air bearing surfaces 103 and from the indented rail portions 104 and 105. The slider 1 is also provided with indented side portions 107 on both sides of the slider body 100, which drop down from the air bearing surfaces 103 and the indented rail portions 104 and 105. In addition, the air bearing surfaces 103 are provided with tapered surfaces 108 at the opposite end from the end where at least one magnetic transducer 2 is located. The number of rail portions 101 and 102 also may be just one or three or more. Reference numbers 21 and 22 indicate bond pads.

As explained above, since the slider 1 is provided with at least one rail portion 101 or 102 which extends between the trailing end TE and the leading end LE on one surface of the slider body 100, the rail surfaces constitute the air bearing surfaces 103 and at least one magnetic transducer 2 is provided on an extended line of the rail portions 101 or 102 toward the trailing end TE of the slider body 100. When it is used in a magnetic read/write apparatus, it achieves stabilization of the flying characteristics with its rail portions 101 or 102 and, at the same time, it generates dynamic lift pressure between the magnetic disk and the air bearing surfaces 103, thereby realizing a magnetic head that performs magnetic write or read operations between at least one magnetic transducer 2 and the magnetic disk.

The rail portions 101 and 102 have indented rail portions 104 and 105 provided along the two sides. With this structure, as in the case of the TPC magnetic head disclosed by White, when mounted in a rotary actuator type magnetic read/write apparatus, dynamic lift pressure is generated at the indented rail portions due to the air current which flows in from the transverse direction when the skew angle is large, to prevent loss of flying height at positions where the skew angle is large. With this, a consistent flying height is ensured from the internal circumference through the external circumference of the magnetic disk and, at the same time, the flight attitude is stabilized.

An important feature of the present invention which differentiates it from the TPC magnetic head disclosed by White is that the indented rail portions 104 and 105 are formed shorter than the rail portions so that the air bearing surfaces 103 will continue all the way to the trailing end TE of the slider body 100. With this structure, when forming the indented rail portions 104 and 105 by positioning a mask that is provided with the required opening portions for forming the indented rail portions on the surface of the slider 1 that faces opposite the medium, and by performing dry etching by milling or the like through the opening portions, the opening portions of the mask for dry etching can be made slightly shorter than the entire length of the rail portions 101, 102. This eliminates the likelihood of minute particles from the slider 1, generated in the dry etching process, adhering to the two side surfaces of the slider 1. As a result, a magnetic head and a magnetic read/write apparatus are achieved in which no damage to the magnetic disk or magnetic head occurs due to substances adhering to the magnetic head.

In addition, since the bond pads are not dry etched excessively in comparison with the slider 1, the surfaces of the bond pads 21 and 22 do not fall off the surface of the slider 1, which in turn makes it easier to connect lead wires to the bond pads 21 and 22.

The width W0 of the air bearing surfaces 103, which are cut into by the indented rail portions 104 and 105, is maintained at approximately the same dimension over the entire length of the indented rail portions 104 and 105. Consequently, in the magnetic head according to the present invention, the major portion of the edges of the air bearing surfaces 103 are linear, and the magnetic head according to the present invention does not have air bearing surfaces as disclosed in U.S. Pat. No. 5,062,017, in which the inside edges and outside edges are made to converge from the leading end of the slider toward an inflection point and then diverge from the inflection point toward the trailing end of the slider 1. Moreover, since the magnetic head according to the present invention is subject to the air bearing effect caused by the indented rail portions, which is basically similar in operation to that of the TPC magnetic heads disclosed by White, the effect differentiates it from the invention disclosed in U.S. Pat. No. 5,062,017. In addition, according to the present invention, the mask pattern for forming the air bearing surfaces 103 can be simplified.

The depth (d) of the indented rail portions 104 and 105 should preferably fall within the range of $1\ \mu m \geq d \geq 0.7\ \mu m$. This amply ensures that an effect similar to that of a TPC slider will be obtained.

At least one magnetic transducer 2 is an induction type element, MR (magnetic resistance) type element or a combination of these. These elements can be constituted of thin film elements formed through processes similar to those in IC manufacturing technology.

Also, the recording method is not limited to the in-plane recording method, but the vertical recording method may be adopted.

Figure 3:
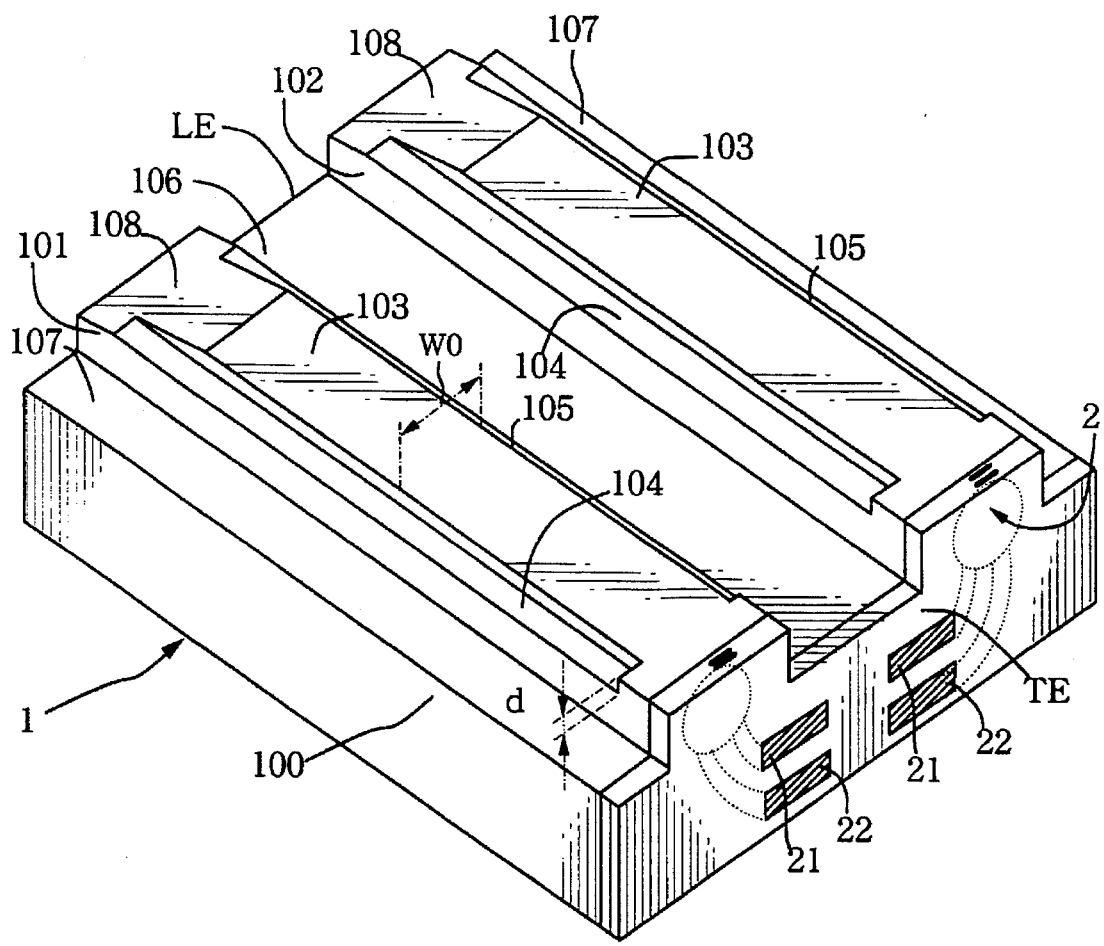
FIG. 3 is a perspective showing another embodiment of the magnetic head according to the present invention.
Figure 4:
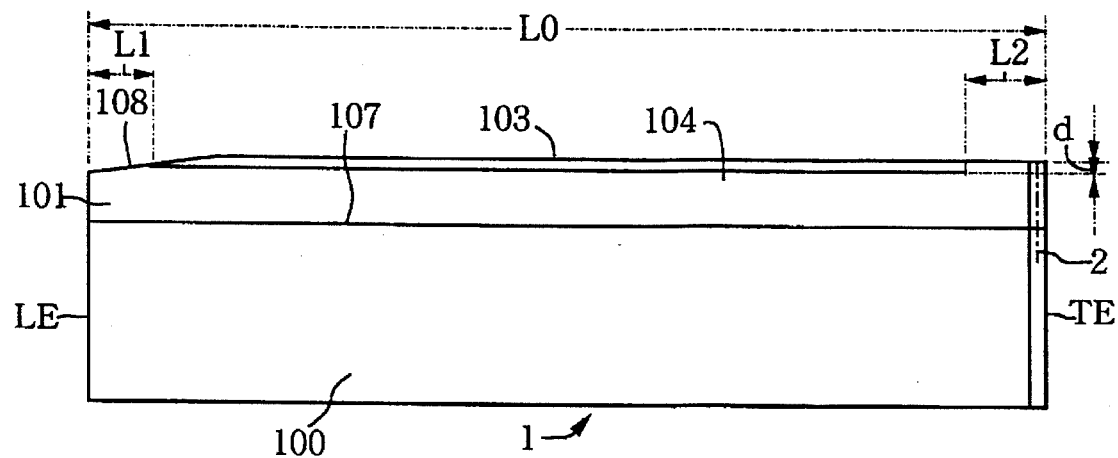
FIG. 4 is a side elevation of the magnetic head shown in FIG. 3.

FIG. 3 is a perspective showing another embodiment of the magnetic head according to the present invention and FIG. 4 is a side elevation of the magnetic head shown in FIG. 3. In this embodiment, the bottom surfaces of the indented rail portions 104 and 105 are continuous to the tapered surfaces 108 at the leading end LE of the slider body 100.

Figure 5:
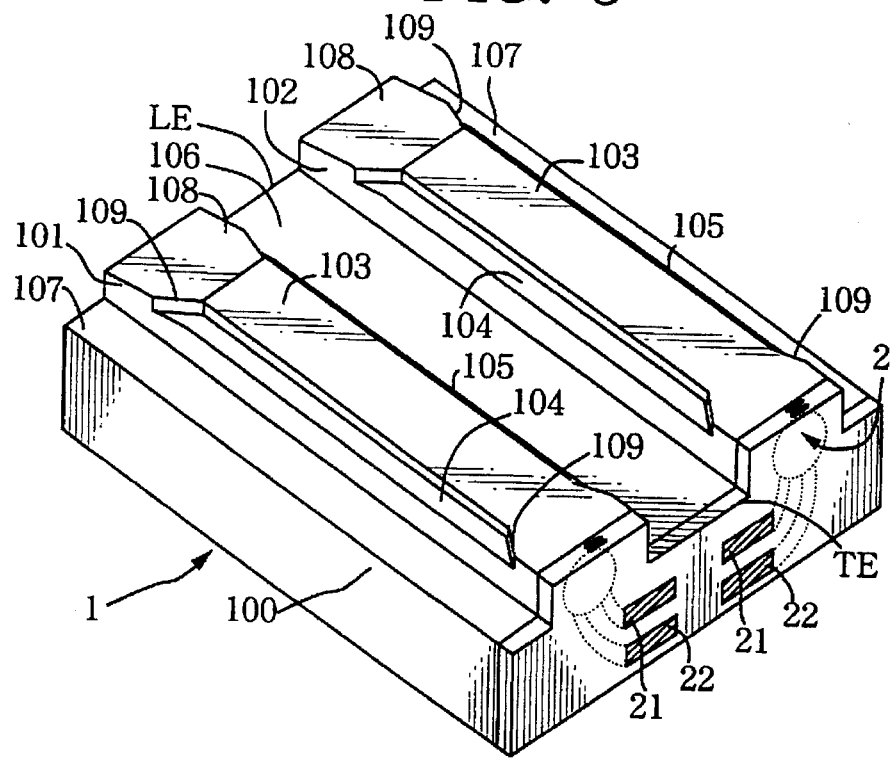
FIG. 5 is a perspective showing yet another embodiment of the magnetic head according to the present invention.
Figure 6:
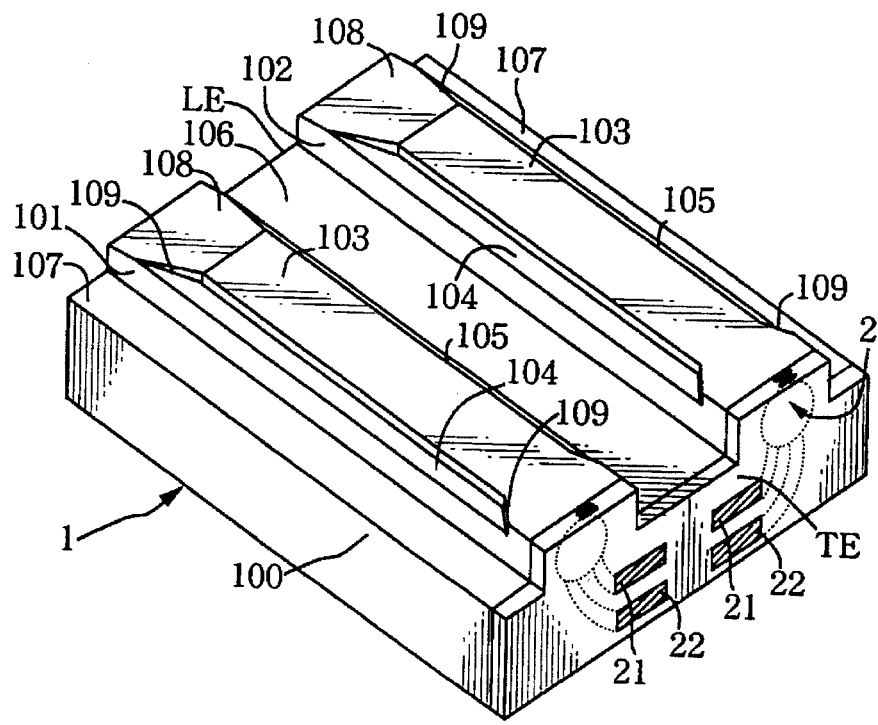
FIG. 6 is a perspective showing yet another embodiment of the magnetic head according to the present invention.

Other embodiments with differing contours of the air bearing surfaces 103 are shown in FIGS. 5 and 6. The basis of the embodiment shown in FIG. 5 is the magnetic head shown in FIGS. 1 and 2. In this embodiment, the edges 109 located at the two ends in the direction of the length of the indented rail portions 104 and 105 are formed diagonally. The basis of the embodiment shown in FIG. 6 is the magnetic head shown in FIGS. 3 and 4. In this embodiment, the edges 109 of the indented portions 104 and 105 are formed diagonally.

Figure 7:
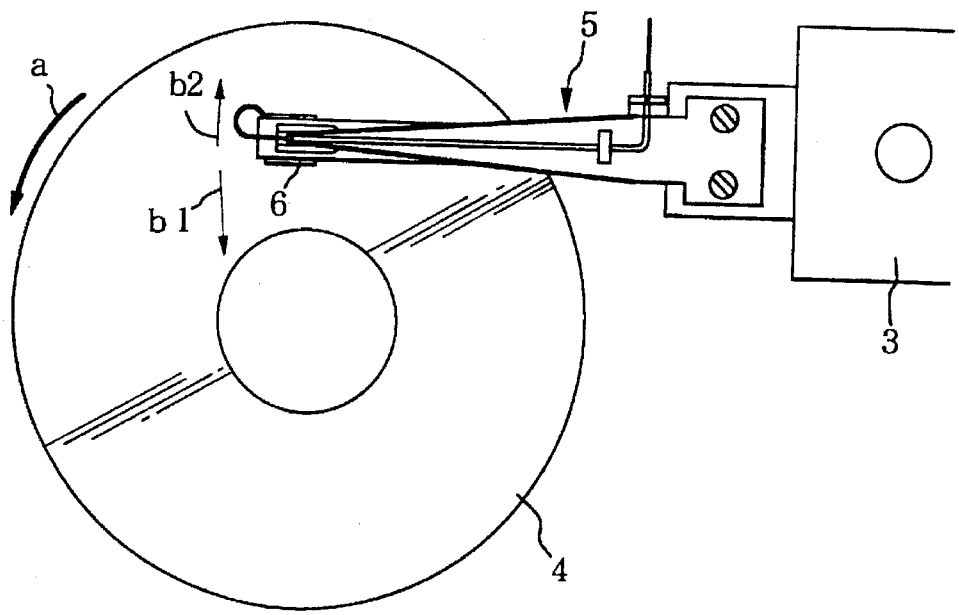
FIG. 7 is a plan view of the magnetic read/write apparatus according to the present invention.

FIG. 7 is a plan view of the magnetic read/write apparatus according to the present invention. The magnetic read/write apparatus according to the present invention includes a magnetic disk 4, a suspension 5 of the known art, and a magnetic head 6 according to the present invention. The magnetic disk 4 is driven rotationally in the direction indicated with the arrow (a) by a rotary drive mechanism (not shown). A positioning apparatus 3, which employs a rotary actuator system, supports one end of the suspension 5 and is driven in the direction indicated with the arrow (b1) or (b2) at a specific angle to the circumference of the magnetic disk 4. With this, write and read operations to and from the magnetic disk 4 are performed on a specific track.

Figure 8:
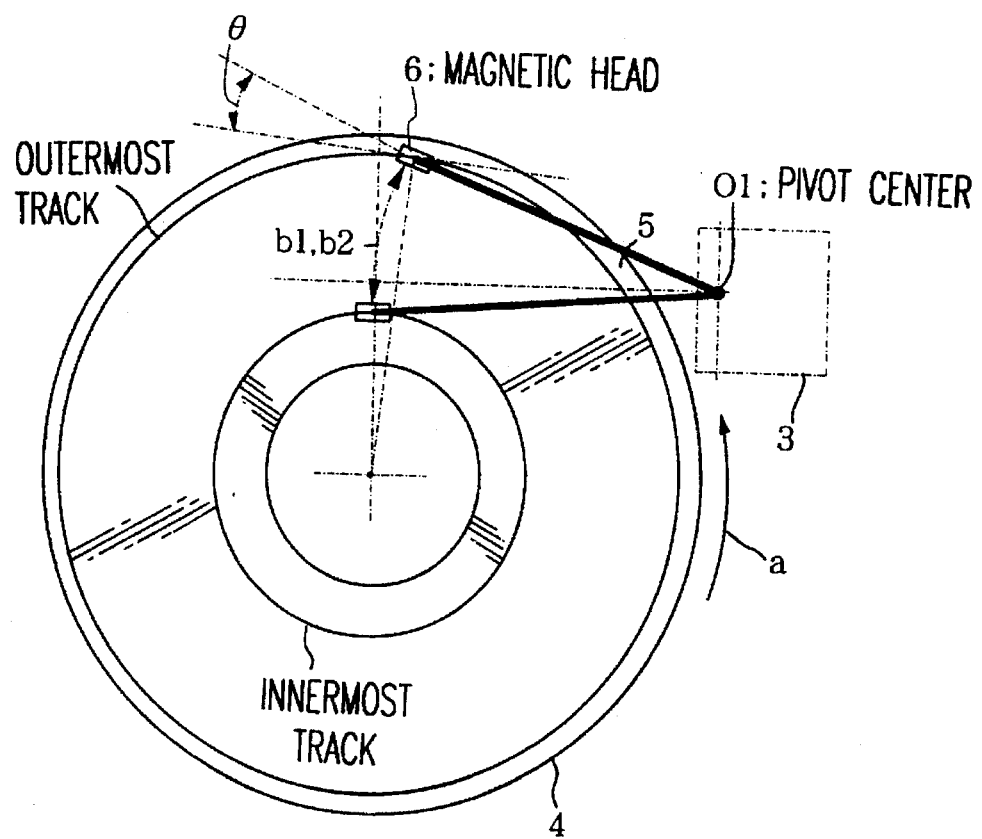
FIG. 8 illustrates the operation of the magnetic read/write apparatus shown in FIG. 7.

FIG. 8 illustrates the read/write operation of the magnetic read/write apparatus shown in FIG. 7. The suspension 5, which supports the magnetic head 6, is driven in the direction indicated with the arrows (b1) and (b2) to swing from the pivot center 01 by the rotary actuator system positioning apparatus 3. The position of the magnetic head 6 on the magnetic disk 4 is normally expressed with the skew angle.

Figure 9:
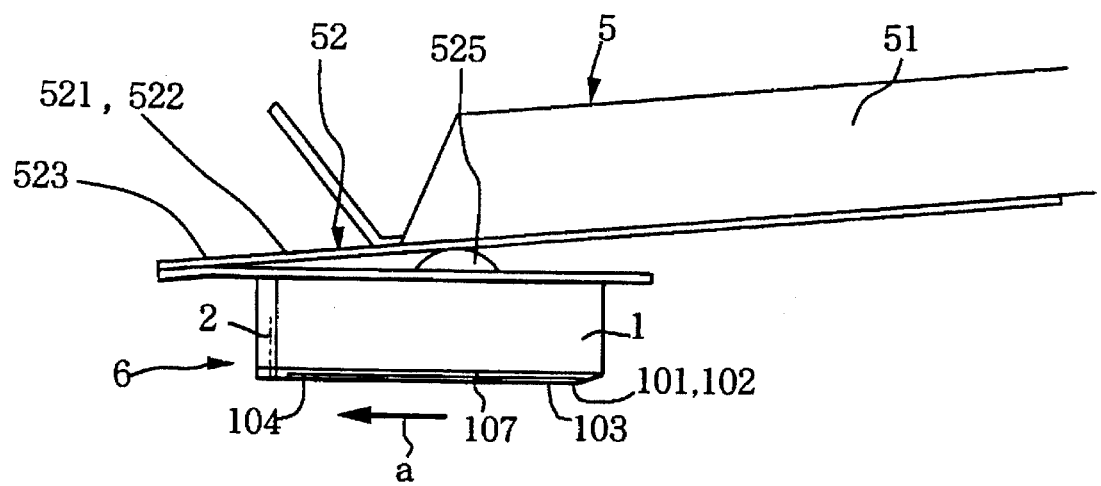
FIG. 9 is a side elevation of the magnetic head apparatus which constitutes the magnetic read/write apparatus according to the present invention.
Figure 10:
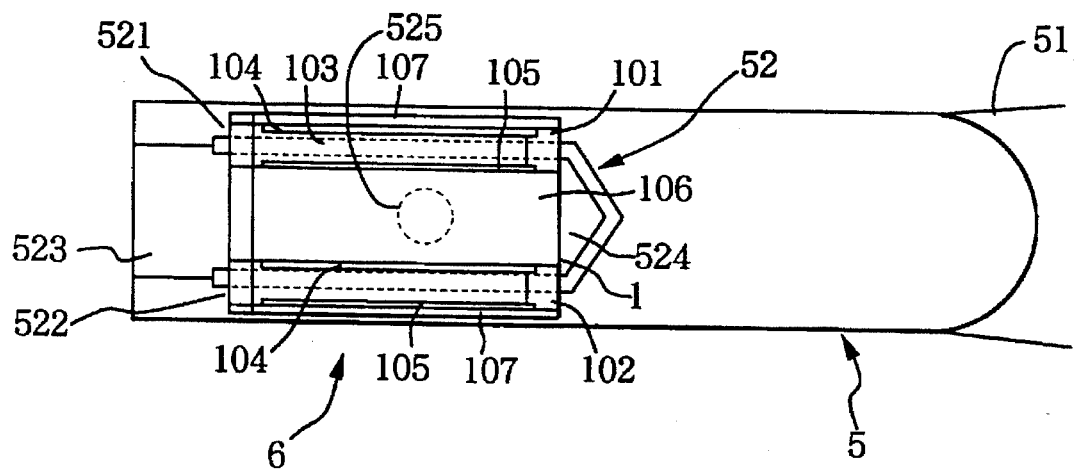
FIG. 10 is a bottom view of the magnetic head apparatus which constitutes the magnetic read/write apparatus according to the present invention.

FIGS. 9 and 10 are a side elevation and a bottom view respectively of the magnetic head apparatus. The suspension 5 is constituted by mounting a flexure 52, which is constituted of a thin metal plate, to the free end at one end of the support member 51, which is also constituted of a thin metal plate, in the direction of its length. By attaching the magnetic head 6 to the lower surface of the flexure 52, a force is applied that tends to press the magnetic head 6 toward the magnetic disk 4. The flexure 52 shown in the figures comprises two flexible fingers 521 and 522, which extend approximately parallel to the axis of the support member 51 in the direction of the length, a cross leg 523 which links the flexible fingers 521 and 522 at the end that is away from the support member 51, and a center tongue 524, which extends from approximately the center of the cross leg 523 approximately parallel to the flexible fingers 521 and 522 with its leading end left free. One of its ends that is opposite from the direction in which the cross leg 523 is located, is attached to the vicinity of the free end of the support member 51 by such means as welding.

On the upper surface of the center tongue 524 of the flexure 52, a dimple 525 is provided, which may be formed, for instance, hemispherically, and with this dimple 525, a force is communicated from the free end of the support member 51 to the center tongue 524. The magnetic head 6 is attached to the lower surface of the center tongue 524 by such means as bonding. The magnetic head 6 is mounted on the suspension 5 in such a manner that the direction of its length aligns with the direction of the length of the suspension 5. The suspension 5 to which the present invention can be applied, is not limited to the embodiment described earlier. A wide range of suspensions which have been disclosed previously and also a wide range of suspensions not yet disclosed can be applied.

Figure 11:
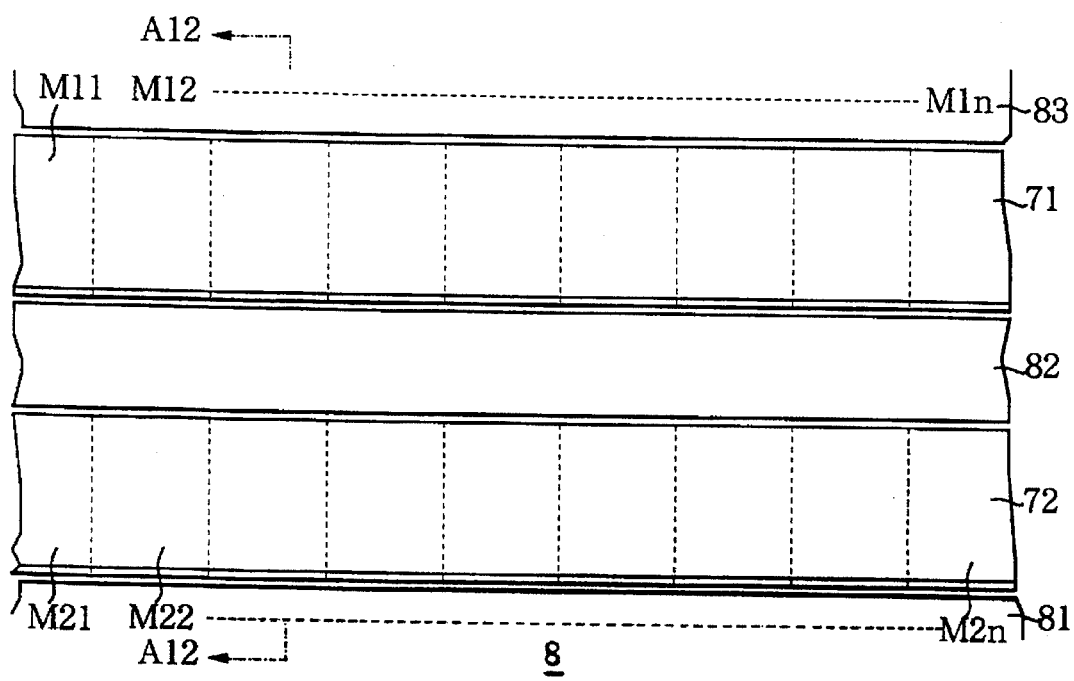
FIG. 11 a plan view of the first process included in the method for manufacturing a magnetic head according to the present invention.
Figure 12:
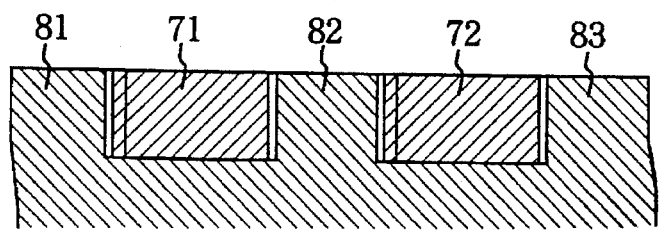
FIG. 12 is a cross section of FIG. 11 through line A12—A12.

Next, the method for manufacturing a magnetic head according to the present invention is explained in reference to FIGS. 11 to 21. The method for manufacturing a magnetic head according to the present invention includes a plurality of processes, as explained below, in manufacturing the magnetic head described above. The first process, as shown in FIGS. 11 and 12, is a process in which the magnetic head aggregates 71 and 72 are positioned on the support members 81 to 83. A magnetic head aggregate includes a section of a wafer to be formed into magnetic head elements, each magnetic head element comprising a slider body and at least one transducer, wherein the at least one transducer for each magnetic head element is formed at a trailing end of the magnetic head aggregate by fabricating a thin film element which is integrated with the slider body. The magnetic head aggregates 71 and 72 are processed into a plurality of magnetic head elements (M11 to M1n), (M21 to M2n) in one direction and, at the same time, the aggregates are positioned on the support members 81 to 83 with the surfaces of the magnetic head elements (M11 to M1n), to the surfaces M2n) which face the magnetic medium exposed out of the indentations. The magnetic head elements (M11 to M1n), (M21 to M2n) are arranged so that each magnetic transducer is positioned at the trailing end of a magnetic head. Unlike the illustrations in the figures, the magnetic head aggregates 71 and 72 may be arrayed on the support members 81 to 83 in such a manner that they are in contact with each other. Also, note that it is desirable to perform a process in which the air bearing surfaces are polished and a process to make tapered surfaces (refer to FIG. 1) in the air bearing surfaces, prior to the first process.

Figure 13:
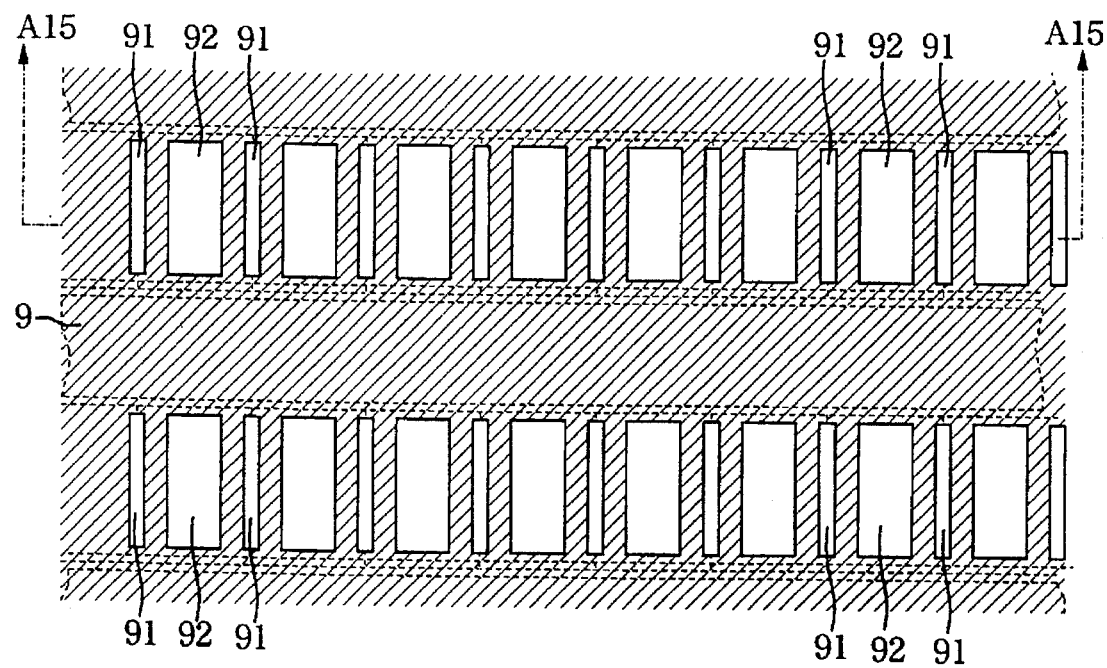
FIG. 13 is a plan view of the second process included in the method for manufacturing a magnetic head according to the present invention.
Figure 14:
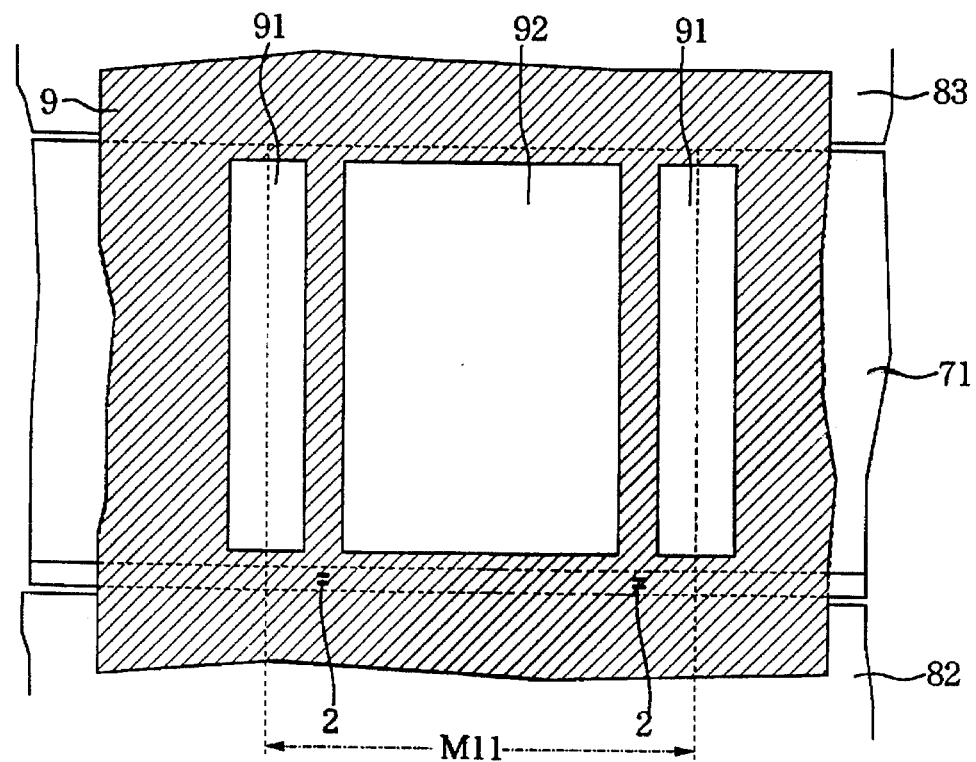
FIG. 14 is a partial enlargement of FIG. 13.

In the second process that follows the first process, a mask 9 is positioned on the surfaces of the magnetic head aggregates 71 and 72 which have been positioned in the first process, as shown in FIGS. 13 and 14. The mask 9 is provided with, at least, opening portions 91 and 92 at positions which correspond to a first indented rail portion and a second indented rail portion. The size of the opening and position of the opening portions 91 and 92 are predetermined and only expose the surfaces of the magnetic head aggregates 71 and 72.

Figure 15:
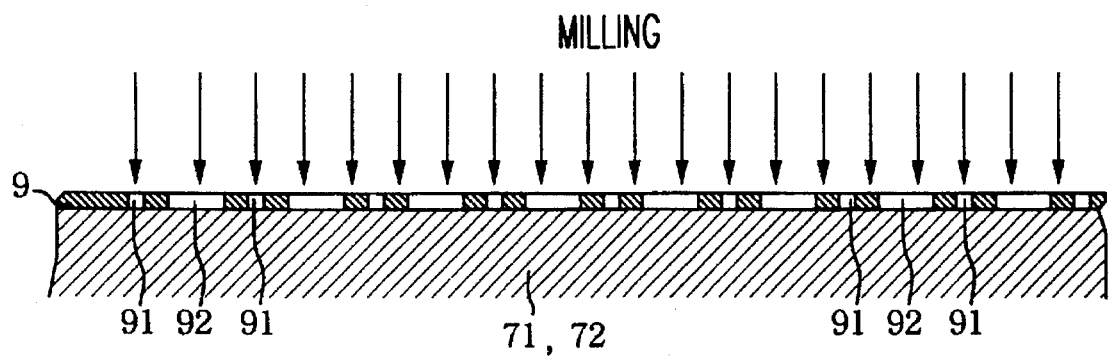
FIG. 15 is a cross section of FIG. 13 through line A15—A15, showing the third process included in the method for manufacturing a magnetic head according to the present invention.

In the third process that follows the second process, as shown in FIG. 15, dry etching is performed to create the first indented rail portion and the second indented rail portion on the surfaces of the magnetic head aggregates 71 and 72 through the opening portions 91 and 92. Milling is a typical example of dry etching. Since the mask 9 is provided with, at least, the opening portions 91 and 92 at positions which correspond to the first indented rail portion and the second indented rail portion, and since the size and the positions of the opening portions 91 and 92 above the magnetic head aggregates 71 and 72 are pre-determined, the minute particles from the slider generated in the dry etching process during the third process can be prevented from becoming adhered to the two side surfaces of the magnetic head aggregates 71 and 72, which constitute the slider. As a result, a TPC magnetic head and a magnetic read/write apparatus, which do not damage the magnetic disk or the magnetic head due to substances adhered to the magnetic head can be manufactured.

Moreover, with the manufacturing method according to the present invention, since the bond pads are not excessively dry etched compared to the slider, the surfaces of the bond pads do not fall off the surfaces of the magnetic head aggregates 71 and 72, which constitute the slider, thereby contributing to making it easier to connect lead wires to the bond pads.

Figure 16:
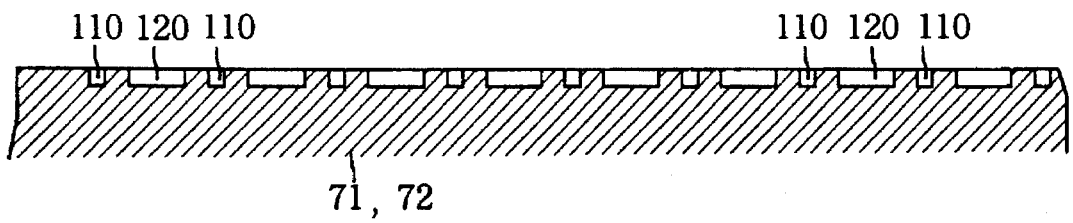
FIG. 16 is a cross section of a magnetic head aggregate obtained through the second and third processes.
Figure 17:
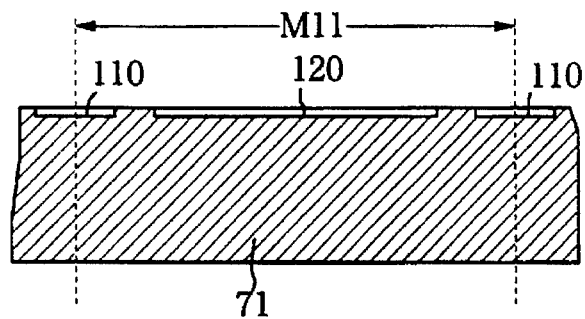
FIG. 17 is an enlarged partial cross section of the magnetic head aggregate shown in FIG. 16.

By undergoing the third process, the portions 110 and 120 for the formation of the first indented rail portion and the second indented rail portions are formed as shown in FIGS. 16 and 17.

Figure 18:
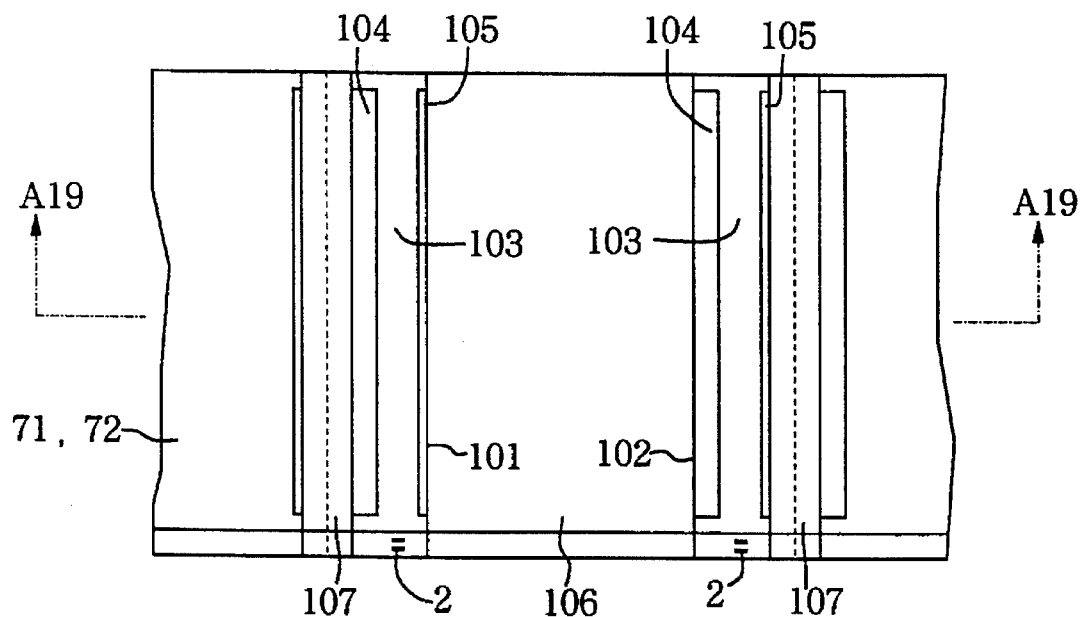
FIG. 18 is a plan view of the fourth process included in the method for manufacturing a magnetic head according to the present invention.
Figure 19:
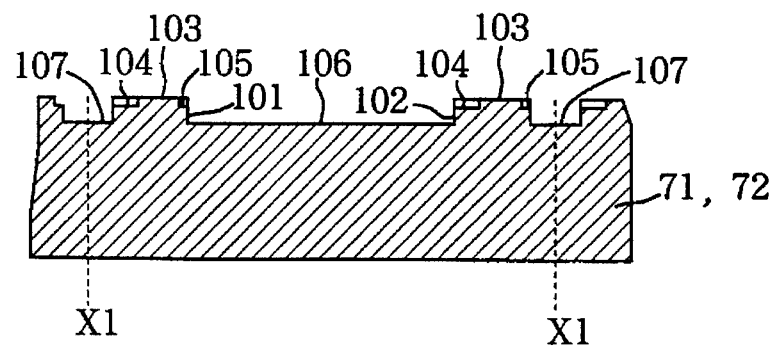
FIG. 19 is a cross section of FIG. 18 through line A19—A19.
Figure 20:
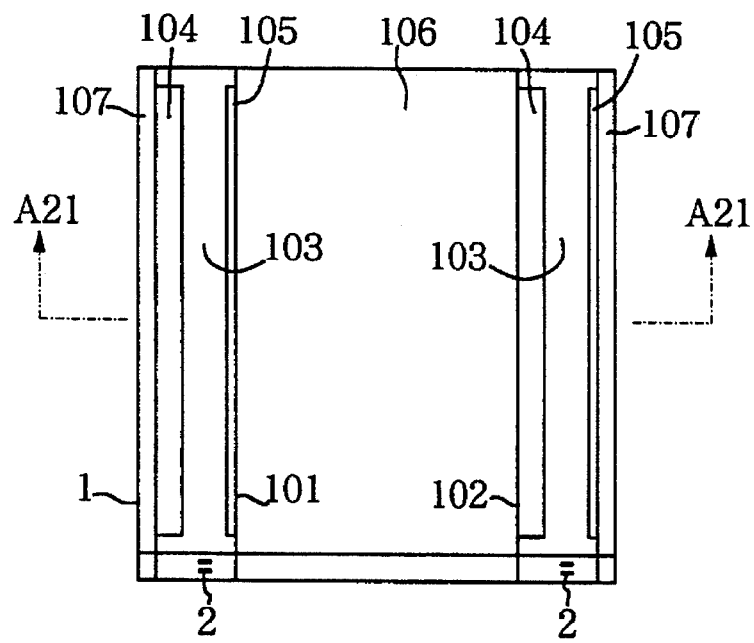
FIG. 20 a plan view of the fourth process included in the method for manufacturing a magnetic head according to the present invention.
Figure 21:
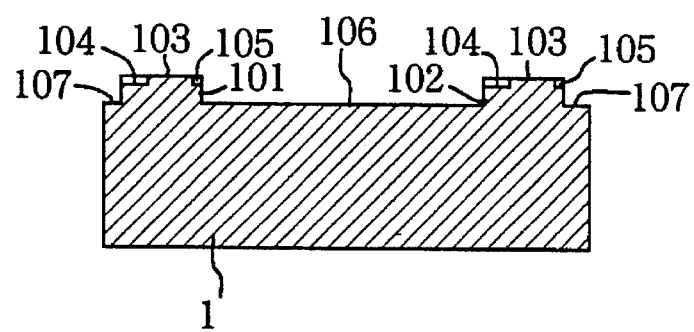
FIG. 21 is a cross section of FIG. 20 through line A21—A21.

The fourth process that follows the third process includes steps in which the machining required for the magnetic head is performed while leaving the portions necessary for forming the first indented rail portion and the second indented rail portion untouched. The main steps included in the fourth process are a step in which a center indented portion and side indented portions (refer to FIG. 1) are formed through machining, and a step in which individual magnetic head elements are separately taken out by cutting. FIGS. 18 and 19 show the step in which a center indented portion 106 and a side indented portions 107 are formed by machining during the fourth process. Through this machining, the first indented rail portion 104 and the second indented rail portion 105 are also formed. FIGS. 20 and 21 show the step in which individual magnetic head elements are separately taken out by cutting. Individual magnetic head elements are obtained by cutting the magnetic head aggregates 71 and 72 at the positions indicated with the cutting lines X1 in FIG. 19.

Preferably, the first process should include a step in which a plurality of magnetic head aggregates 71 and 72 are positioned parallel to each other. This will improve the efficiency with which the work is performed. In such a case, it is preferable that the second process should include a step in which a mask 9 is positioned for the aforementioned plurality of magnetic head aggregates 71 and 72. The mask 9 is constituted of film, resist or the like. The opening portion 91 and 92 of the mask 9 can be formed through high precision patterning technology such as photo lithography.

While the invention has been particularly shown and described with reference to preferred embodiments thereof, it will be understood by those skilled in the art that various changes in form and detail may be made therein without departing from the spirit, scope and teaching of the invention.

What is claimed is:

1. A method for manufacturing plural magnetic head elements from a magnetic head aggregate, comprising the steps of:

placing a magnetic head aggregate in an indentation of an indented support member such that a first face of the magnetic head aggregate to be processed faces out of the indented support member and such that a second face of the magnetic head aggregate which is perpendicular to the first face abuts a side edge of the indented support member along a height of the indentation, said second face being a mounting face with at least one magnetic transducer;

positioning a mask over the first face of the magnetic head aggregate and over the indented support member to create plural indented rail portions in plural rails of the magnetic head aggregate, said mask including plural openings having pre-determined positions above only the magnetic head aggregate which was placed in the indentation, wherein the plural openings are shorter than the length of the plural rails;

dry etching through the plural openings to create the plural indented rail portions in the magnetic head aggregate;

machining the magnetic head aggregate to create indented side portions and indented center portions; and cutting the magnetic head aggregate into plural magnetic head elements without cutting the plural rail portions.

2. The method according to claim 1, wherein the step of positioning further comprises positioning the plural openings of the mask such that each of the plural openings is an opening having substantially a same width over its length.

3. A method for manufacturing plural magnetic head elements from plural magnetic head aggregates, comprising the steps of:

placing plural magnetic head aggregates in indentations of an indented support member such that first faces of the magnetic head aggregates to be processed face out of the indented support member and such that second faces of the magnetic head aggregates which are perpendicular to the first faces abut side edges of the indented support member along a height of the indentations, said second faces each being mounting faces with at least one magnetic transducer;

positioning a mask over the first faces of the magnetic head aggregates and over the indented support member to create plural indented rail portion, said mask including plural openings having pre-determined positions above only the magnetic head aggregates which were placed in the indentation wherein the plural openings are shorter than the length of the plural rails;

dry etching through the plural openings to create the plural indented rail portion;

machining the plural magnetic head aggregates to create indented side portions and indented center portions; and cutting the plural magnetic head aggregates into plural magnetic head elements without cutting perpendicular to the plural rail portions.

4. The method according to claim 3, wherein the step of positioning further comprises positioning the plural openings of the mask such that each of the plural openings is an opening having substantially a same width over its length.

* * * * *